(12) United States Patent
Kimhi (10) Patent No.: US 11,157,761 B2
(45) Date of Patent: Oct. 26, 2021

(54) IR/VISIBLE IMAGE CAMERA WITH DUAL MODE, ACTIVE-PASSIVE-ILLUMINATION, TRIGGERED BY MASKED SENSOR TO REDUCE POWER CONSUMPTION

(71) Applicant: EMZA VISUAL SENSE LTD., Givatayim (IL)

(72) Inventor: Tomer Kimhi, Tel Aviv (IL)

(73) Assignee: EMZA VISUAL SENSE LTD., Givatayim (IL)

( * ) Notice: Subject to any disclaimer, the term of this patent is extended or adjusted under 35 U.S.C. 154(b) by 0 days.

(21) Appl. No.: 17/076,828

(22) Filed: Oct. 22, 2020

(65) Prior Publication Data

US 2021/0117710 A1 Apr. 22, 2021

Related U.S. Application Data

(60) Provisional application No. 62/924,188, filed on Oct. 22, 2019.

(51) Int. Cl.
*G06K 9/20* (2006.01)
*G06K 9/00* (2006.01)

(52) U.S. Cl.
CPC ....... *G06K 9/2027* (2013.01); *G06K 9/00228* (2013.01); *G06K 9/00362* (2013.01); *G06K 9/00624* (2013.01)

(58) Field of Classification Search
CPC ............. G06K 9/2027; G06K 9/00228; G06K 9/00362; H01L 31/02164; H04N 2209/043
See application file for complete search history.

(56) References Cited

U.S. PATENT DOCUMENTS

| | | | | |
|---|---|---|---|---|
| 9,906,722 | B1* | 2/2018 | Gigot | H04N 5/232411 |
| 10,848,681 | B2* | 11/2020 | Tang | H04N 5/2256 |
| 2009/0259865 | A1* | 10/2009 | Sheynblat | H04W 52/0293 |
| | | | | 713/323 |
| 2011/0134251 | A1* | 6/2011 | Kim | G06F 1/3231 |
| | | | | 348/164 |

(Continued)

OTHER PUBLICATIONS

P. Lapray et. al, "Multispectral Filter Arrays: Recent Advances and Practical Implementation," Sensors 2014, 14(11), 21626-21659. (Year: 2014).*

(Continued)

*Primary Examiner* — Michael Robert Cammarata
(74) *Attorney, Agent, or Firm* — Alphapatent Associates, Ltd; Daniel J. Swirsky (57) ABSTRACT

An object recognition device, method and computer program product, the device including a sensor having a plurality of pixels, a mask, where the pixels include a non-masked first group that receives a first wavelength, and a masked second group that receives a second wavelength differing from the first, where the mask passes at most 10% of energy of the first wavelength, and the second group are a majority of the pixels, a light source radiating in the second wavelength, and a processor for operating in a first mode where light in the first wavelength is received by the first group, including capturing a first image by the first group, and analyzing the first image, to recognize a trigger event, and subject to the trigger event, operating in a second mode, including: activating the light source, capturing a second image by the second group, and analyzing the second image.

19 Claims, 5 Drawing Sheets

(56) References Cited

U.S. PATENT DOCUMENTS

| | | | | |
|---|---|---|---|---|
| 2012/0327248 | A1* | 12/2012 | Tack | G01J 3/26 |
| | | | | 348/164 |
| 2013/0156273 | A1* | 6/2013 | Nielsen | H04N 5/33 |
| | | | | 382/118 |
| 2014/0168372 | A1* | 6/2014 | Chang | G01S 17/86 |
| | | | | 348/46 |
| 2015/0206415 | A1* | 7/2015 | Wegelin | G08B 21/22 |
| | | | | 340/573.4 |
| 2017/0061210 | A1* | 3/2017 | Ollila | H04N 1/00307 |
| 2017/0140221 | A1* | 5/2017 | Ollila | G02B 27/58 |
| 2017/0230551 | A1* | 8/2017 | Akkaya | H04N 9/045 |
| 2017/0324901 | A1* | 11/2017 | Mandelli | H04N 5/3696 |
| 2018/0124327 | A1* | 5/2018 | Alasirnio | H04N 5/2256 |
| 2018/0173986 | A1* | 6/2018 | Gousev | G06K 9/00617 |
| 2018/0189547 | A1* | 7/2018 | Daniels | G06K 9/2027 |
| 2018/0336698 | A1* | 11/2018 | Park | G06K 9/2063 |
| 2019/0068908 | A1* | 2/2019 | Kobayashi | H04N 5/343 |
| 2019/0210563 | A1* | 7/2019 | Slovesko | B60J 5/0405 |
| 2019/0364229 | A1* | 11/2019 | Stec | H04N 5/3532 |
| 2020/0057943 | A1* | 2/2020 | Fridental | G06F 16/434 |
| 2020/0228753 | A1* | 7/2020 | Ortiz Egea | H04N 5/247 |

OTHER PUBLICATIONS

Lu, Y.M.; Fredembach, C.; Vetterli, M.; Süsstrunk, S. Designing Color Filter Arrays for the Joint Capture of Visible and Near-Infrared Images. In Proceedings of the 16th IEEE International Conference on Image Processing (ICIP), Cairo, Africa, Nov. 7-10, 2009; pp. 3753-3756. (Year: 2009).*

* cited by examiner

IR/VISIBLE IMAGE CAMERA WITH DUAL MODE, ACTIVE-PASSIVE-ILLUMINATION, TRIGGERED BY MASKED SENSOR TO REDUCE POWER CONSUMPTION

TECHNICAL FIELD

The present disclosure relates to cameras in general, and to a dual mode always-on camera associated with visual recognition, in particular.

BACKGROUND

Nowadays many devices and applications comprise and use cameras. Cameras are contained in mobile devices such as mobile phones, laptops, tablets, or the like, as well as in fixed devices such as security systems, admission control systems, and others. The cameras are used for applications including but not limited to recognition including face recognition or verification.

In order to ensure continuous operation, such devices may require batteries as a sole energy source for mobile devices, or in addition to connection to the electrical network, for fixed devices.

Thus, power consumption is an important concern of manufacturers and users of such devices. Especially in mobile devices, in addition to increasing the usage cost, high power consumption may also add a burden of frequent battery replacement or charging.

Many devices execute advanced applications, for example access control applications, that require active illumination and in particular IR illumination. However, such illumination consumes considerable power, and may drains the battery quickly.

Therefore, camera-equipped devices are required, which can operate with low power consumption, even for recognition purposes.

SUMMARY

One aspect of the disclosure relates to an object recognition device, comprising: an image sensor comprising a plurality of pixels; a mask, wherein the plurality of pixels comprise pixels of a first group that are not masked by the mask and receive one or more first wavelength range, and pixels of a second group that are masked by the mask and receive one or more second wavelength range, wherein the mask passes at most 10% of energy received in the first wavelength ranges, wherein the first wavelength ranges are different from the second wavelength ranges, and wherein the pixels of the second group are a majority of the pixels; a light source radiating in the second wavelength ranges; and a processor for: operating in a first mode in which the light source is inactive, including: capturing a first image by the pixels of the first group; and analyzing the first image, to recognize whether a trigger event has occurred; and subject to occurrence of the trigger event, operating in a second mode, including: activating the light source; capturing a second image by the pixels of the second group; and analyzing the second image. The object recognition device may further comprise a second mask for masking the pixels of the first group. Within the object recognition device, the second wavelength range optionally comprises Infra-Red range and the light source optionally comprises an Infra-Red light source. Within the object recognition device, the first wavelength range optionally comprises ambient light. Within the object recognition device, the pixels of the second group are optionally at least 75% of the plurality of pixels. Within the object recognition device, the pixels of the first group are optionally arranged in a repeating pattern over the image sensor. Within the object recognition device, the processor is optionally further adapted to resume operation in the first mode after analysis of the second image. Within the object recognition device, the image sensor is optionally configured to capture a body part of a subject. Within the object recognition device, the body part is optionally a face. Within the object recognition device, in the second mode, a value of a pixel of the first group is optionally set in accordance with values of neighboring pixels belonging to the pixels of the second group. The object recognition device is optionally always on. The object recognition device may further comprise interface to an external engine for taking an action in response to the analysis of the second image.

Another aspect of the disclosure relates to a method for activating an object recognition device, comprising: operating in a first mode, including: capturing a first image by pixels of a first group of pixels of a sensor comprising a multiplicity of pixels; and analyzing the first image, to recognize whether a trigger event has occurred; and subject to occurrence of the trigger event, operating in a second mode, including: activating a light source to illuminate the sensor; capturing a second image by pixels of a second group of pixels of the sensor; and analyzing the second image, wherein a mask is masking the pixels of the second group and not masking the pixels of the first group, the pixels of the first group receive one or more first wavelength ranges, the pixels of the second group receive one or more second wavelength ranges different from the first wavelength ranges, wherein the light source illuminates in the second wavelength ranges, the mask passes at most 10% of energy received in the first wavelength ranges, the pixels of the second group outnumber the pixels of the first group. Within the method, the pixels of the first group are optionally masked by a second mask passing the first wavelength ranges. Within the method, the second wavelength range optionally comprise Infra-Red range and the light source is optionally an Infra-Red light source. Within the method, the first wavelength ranges optionally comprise ambient light. Within the method, the pixels of the first group are optionally arranged in a repeating pattern over an image sensor comprising the pixels of the first group of and the pixels of the second group. Within the method, the processor is optionally further adapted to resume operation in the first mode after analysis of the second image. The method can further comprise setting a value of a pixel of the first group in accordance with values of neighboring pixels belonging to the second group. Within the method, the processor optionally operates constantly in the first mode excluding when the second mode is assumed. The method can further comprise taking an action in response to a result of analyzing the second image. Within the method, the action optionally comprises granting or denying access of a person to a physical or computerized domain.

Yet another aspect of the disclosure relates to a computer program product comprising a computer readable storage medium retaining program instructions, which program instructions when read by a processor, cause the processor to perform a method comprising: operating in a first mode, including: capturing a first image by pixels of a first group of pixels of a sensor comprising a multiplicity of pixels; and analyzing the first image, to recognize whether a trigger event has occurred; and subject to occurrence of the trigger event, operating in a second mode, including: activating a light source to illuminate the sensor; capturing a second image by pixels of a second group of pixels of the sensor; and analyzing the second image, wherein a mask is masking the pixels of the second group and not masking the pixels of the first group, the pixels of the first group receive one or more first wavelength ranges, the pixels of the second group receive one or more second wavelength ranges different from the first wavelength ranges, wherein the light source illuminates in the second wavelength ranges, the mask passes at most 10% of energy received in the first wavelength ranges, the pixels of the second group outnumber the pixels of the first group.

BRIEF DESCRIPTION OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Always-on devices, and in particular devices comprising cameras, need to be operable with low power consumption, in order to lower the usage cost and the burden of charging or replacing batteries. Many of these devices require simultaneous or alternating use of a first mode, employing low-power, always-on, ambient light imaging, and a second mode imaging requiring IR illumination which is a significant energy consumer. Ambient light may refer to natural or common artificial light, such as daylight, normal room lightning, or the like. In some embodiments, images captured by the second mode may be of higher resolution than images captured by the first mode.

Thus, one technical problem of the disclosure relates to providing a device which combines an illuminated higher power mode, with an always-on low-power mode in which only ambient light is used, such that the overall power consumption is significantly lower relative to systems in which the high power mode is always on. The devices may be used, but are not limited to, applications such as access control systems, which may be provided by fixed devices protecting restricted areas, mobile devices such as laptops or mobile phones, or the like. The devices may use recognition methods such as face recognition, iris recognition, or the like.

Some systems use Infra-Red LEDs for illuminating, for a multiplicity of reasons, including that IR LEDs are very efficient, and also form better contrast with ambient light than other light sources. In some applications, and in particular 3D applications, the IR light may be structured into strips or spots of a predetermined pattern, and an IR sensor, located some distance away from the light source (e.g., 2-20 cm) captures the resulting image. The parallax, or shift, of the illuminated pattern relates linearly to the depth of the object reflecting the light. However, such light source, a full-resolution camera and the applicable subsequent processing require significant amounts of power.

Other systems provide always-on activity, and use a sensor sensitive to ambient light, for example in the wavelength range of 380-750 nm. Such systems have other drawbacks, such as low performance in 3D analysis of a captured image.

One technical solution of the disclosure is a device comprising a light source such as an IR light source, and a CMOS image sensor (CIS) chip which combines ambient light sensing with another light sensing, for example IR sensing. Thus, the CIS may comprise a first mask masking a first group of pixels, such that the pixels of the first group receive one or more first wavelength ranges for example ambient light, and a second mask masking a second group of pixels, such that the pixels of the second group receive one or more second wavelength ranges such as IR light, such that the first wavelength ranges differ from the second wavelength ranges, and wherein the pixels of a second group are a majority of the pixels, i.e. the pixels of the second group outnumber the pixels of the first group.

In some embodiments, one of the masks may be omitted. For example, the device can comprise only the second mask which passes only the second wavelength ranges, for example the IR light to the pixels of the second group which are the majority of the sensor pixels, and passes the first wavelength ranges, for example the ambient light to the pixels of the first group which are the minority of the pixels.

It will be appreciated that the ambient light and the IR light are merely examples, and any other ranges or groups of ranges may be used, such that the pixels of the first type may or may not be masked by a first mask, and/or the pixels of the second type may or may not be masked by a second mask different from the first mask.

It will also be appreciated that a mask designed to pass certain wavelengths may not fully block other wavelengths. However, for practical purposes, a mask will be referred to as blocking or not passing certain light frequencies if it passes at most a predetermined part of the energy radiated on the sensor in said frequencies, for example up to 2%, up to 5%, up to 10%, up to 25%, or the like. Similarly, a mask will be referred to as passing certain light frequencies if it passes at least a predetermined part of the energy radiated on the sensor in said frequencies, for example at least 75%, at least 90%, at least 95%, at least 98%, or the like.

By default, the device is active at a first mode without activating a light source, such that only the pixels which receive the ambient light are activated and analyzed. These pixels may be referred to as pixels of a first type. When a trigger is determined, by analyzing an image captured by the pixels of the first type in accordance with the first mode, the device may start operating in a second mode, in which the IR light source may be turned on and illuminate the sensor. The pixels that receive IR, which may constitute the majority of the sensor pixels and may be referred to as pixels of a second type, may then receive the light, and an image may be captured from these pixels, and processed in accordance with the second mode, for example for face verification or any other application. Once processing is done, the device resumes operation in the first mode.

The pixels of the first type, which constitute a minority of the sensor pixels for example about 0.01%-25% of the pixels, may be sufficient for sensing activity and setting a trigger, while the pixels of the second type which are sensitive to the illumination wavelength range, for example the IR illumination which is activated in response to the trigger, are sufficient for carrying out the specific application, for example face recognition.

It will be appreciated that the dual mode device may be implemented with any combination of pixels of two groups, that receive different wavelengths. For example, pixels of the first group can be sensitive to any light that is available in the vicinity of the device, while pixels of the second group may be sensitive to light provided by a dedicated light source of the device.

Figure 1:
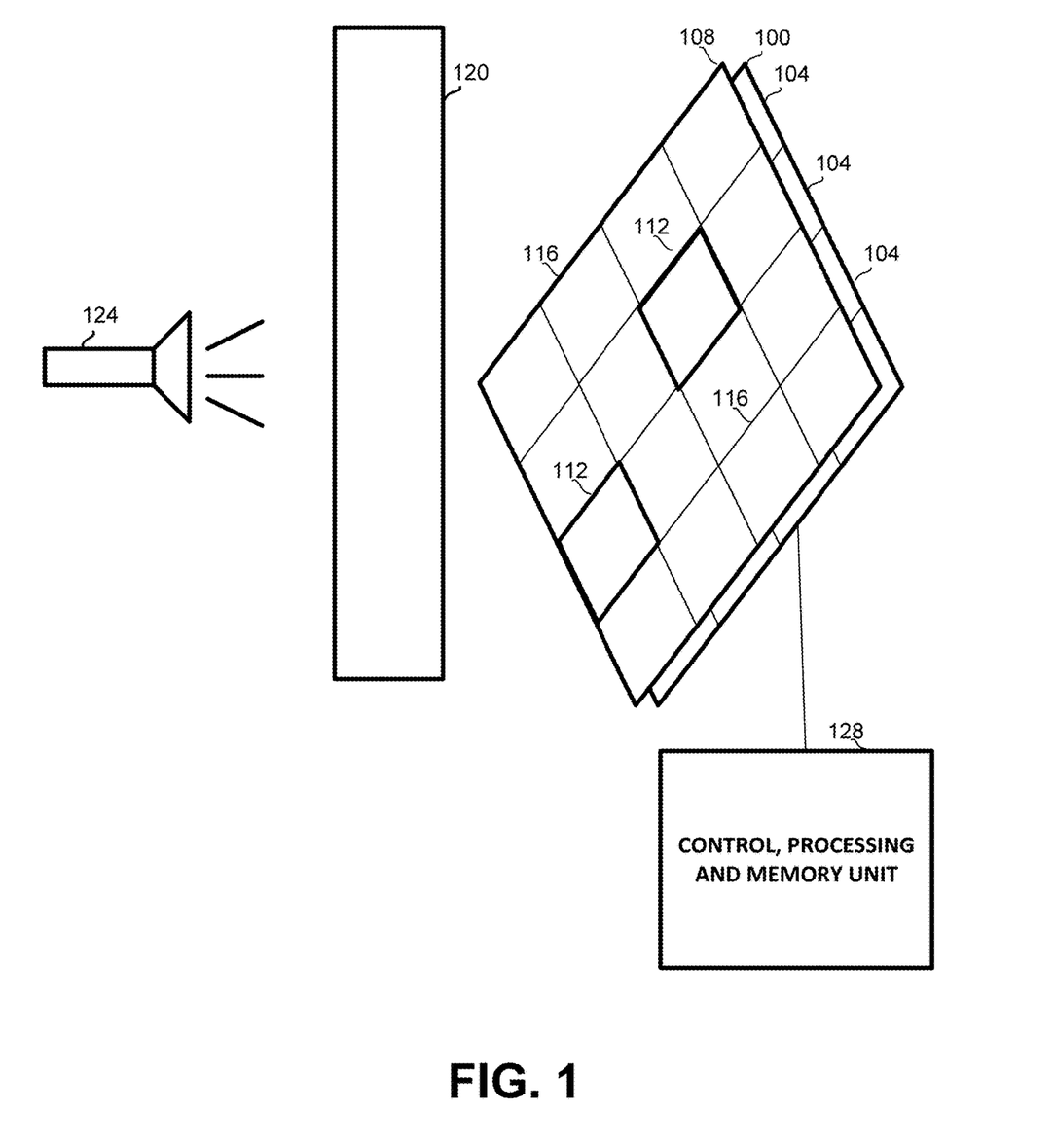
FIG. 1 is a schematic illustration of a dual mode capture and processing device, in accordance with some exemplary embodiments of the disclosed subject matter.

One technical effect of the disclosure thus relates to a dual mode device, which operates in an ongoing manner in a low power mode, and consumes additional power only for short periods of time, when it is required to activate a dedicated light source and perform application-specific image processing. The device may thus be operated for longer periods of time without battery replacing or charging. The additional cost for the dual mode device is insubstantial relative to other sensors designed for the same purpose Referring now to FIG. 1, showing a schematic illustration of a dual mode capture and processing device in accordance with the disclosure.

The device comprises a light source 124, emitting light in a predetermined wavelength range, for example in the IR wavelength range.

The device comprises a light-sensitive sensor, generally referenced 100, which comprises a multiplicity of pixels 104. The device can further comprise a mask 108 situated substantially parallel and attached to sensor 100, for example by diffusion or deposition, such that any light that would reach sensor 100, passes through and is modulated by mask 108. Mask 108 can comprise a plurality of areas 112 and 116, each situated against one or more pixels. A minority of the areas, for example areas 112 comprise pixels of a first group which are not masked, or are masked by a mask of another type, for example to block light of any wavelength, such as but not limited to IR light, such that for example ambient light can only pass through to the corresponding pixels which are situated closer to these areas than other pixels. The majority of the areas, such as areas 116 comprise pixels of a second group which may be masked such that only light in the wavelength range emitted by light source 124 passes through to the respective pixels. The mask may be implemented as a layer, for example of pigmented or dye-doped organic color resists, deposited on the CMOS wafer as part of the production process. It will be appreciated that each area 112 or 116 may pass light to one or more sensor pixels.

In some embodiments, the sensor pixels of the first group may be implemented with different characteristics or parameters from the characteristics or parameters of the pixels of the second group. However, the pixels may be identical, and provide different output due to the different making.

The device may also comprise a lens array 120, comprising one or more lenses, according to the optical requirements and design of the device, as is well known in the art of CMOS imager production.

The device can also comprise control, processing and memory unit 128, for setting the camera control to a required mode as described in association with FIG. 4 below; to receive images from sensor 100 according to the mode: in a first mode images based upon the pixels of the first group corresponding to areas 112, and in the second mode images based upon the pixels of the second group corresponding to areas 116; and process each image in a predetermined manner corresponding to the active mode.

Figure 2A:
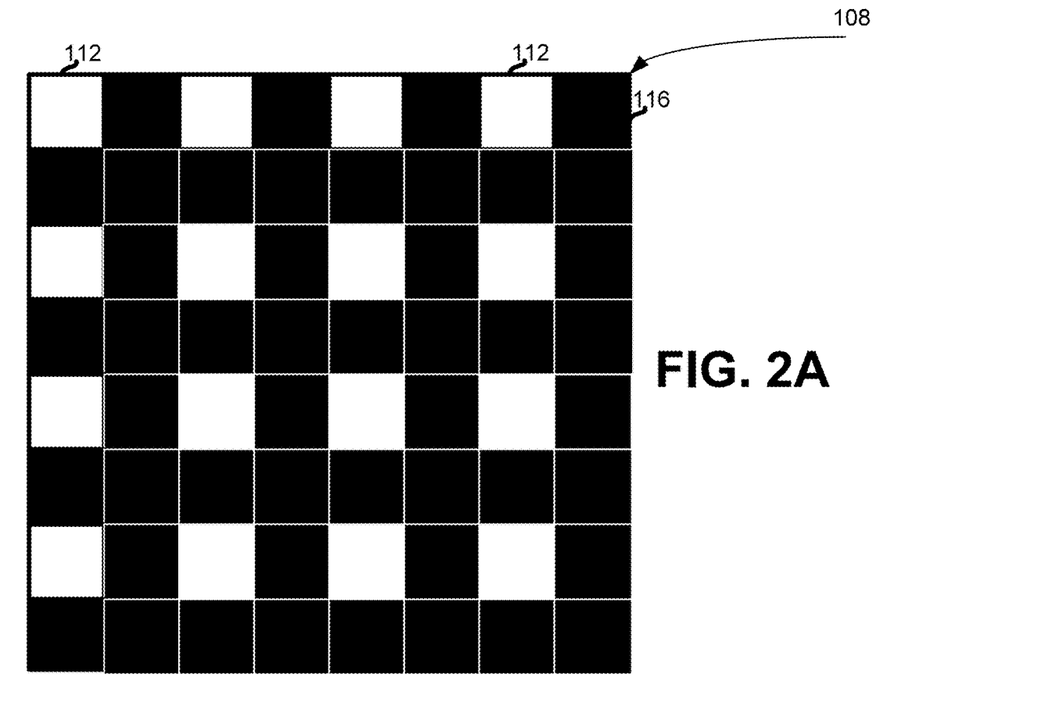
FIGS. 2A, 2B and 2C provide schematic illustrations of exemplary mask configurations, in accordance with some exemplary embodiments of the disclosed subject matter.
Figure 2B:
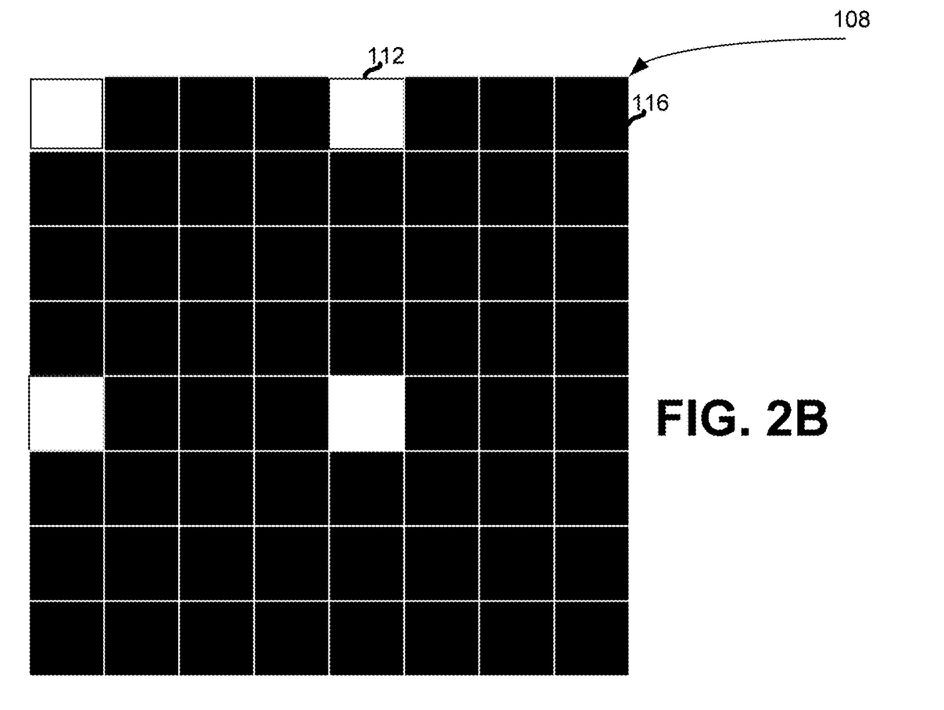
Figure 2C:
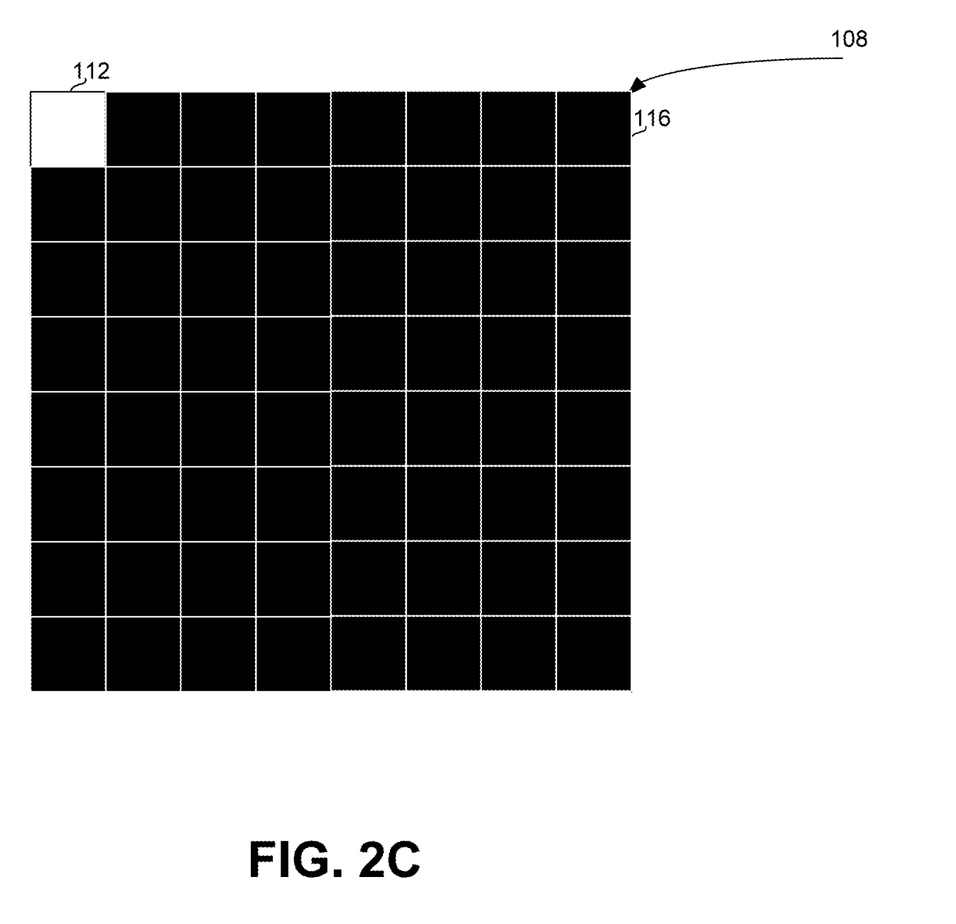

Referring now to FIGS. 2A-2C, showing different exemplary configurations of mask 108, in which the non-masked areas are arranged in a repeating pattern over the sensor. FIG. 2A shows mask 108 with a 1:3 ratio between the non-masked areas 112, which pass ambient light to the pixels of the first group, and masked areas 116 which pass only the specific wavelength, such as IR to the corresponding pixels of the second group.

FIG. 2B shows mask 108 with a 1:15 ratio between the number of pixels of the first group 112, and the number of pixels of the second group 116, and FIG. 2C shows mask 108 with a 1:63 ratio between the number of pixels of the first group in areas 112 and the number of pixels of the second group in areas 116. It will be appreciated that the abovementioned ratios are exemplary only, and other ratios may also be used. For example, if an imager has 20M pixels, and only quarter-quarter VGA (QQVGA) are masked, being 160*120=19,200 pixels being used for the "always on" state, a ratio of about 1:1,000 is yielded. In further embodiments, the ratio may be even higher.

It will be appreciated that FIGS. 2A-2C are exemplary only, and that other configurations may be implemented. For example, areas 112 may be masked by a mask passing the ambient light and different from the mask of areas 116.

Figure 3:
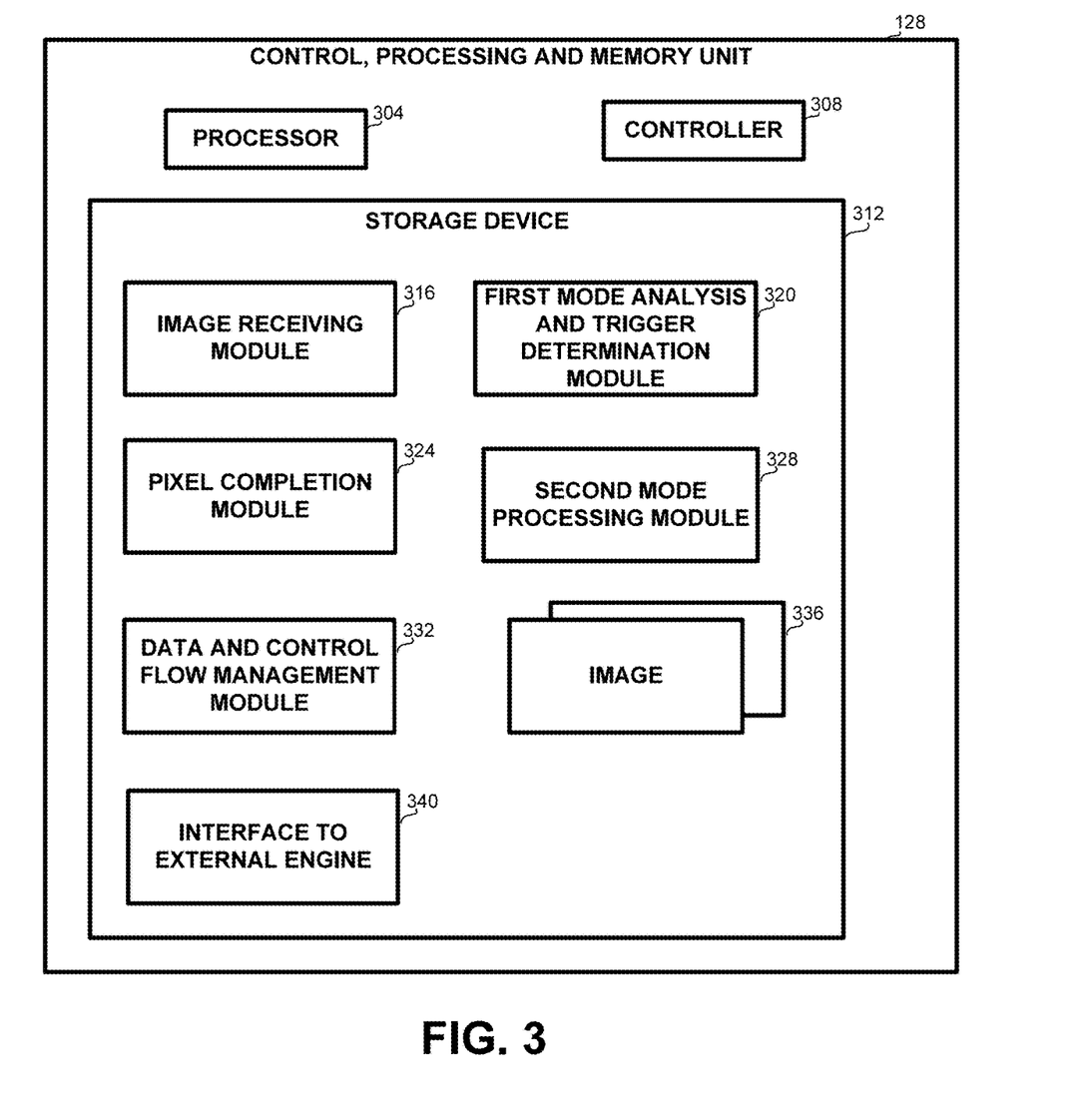
FIG. 3 is a generalized block diagram of a control, processing and memory unit of a dual mode object recognition device, in accordance with some exemplary embodiments of the disclosed subject matter.

Referring now to FIG. 3, showing a schematic block diagram of control, processing and memory unit (CPMU) 128 of FIG. 1.

CPMU 128 may be implemented as one or more computing platforms. In some embodiments, CPMU 128 or components thereof may be embedded within a camera.

CPMU 128 may comprise one or more processors 304, such as one or more Central Processing Units (CPU), microprocessors, electronic circuits, Integrated Circuits (IC) or the like. Processor 304 may be configured to provide the required functionality, for example by loading to memory and executing the modules stored on storage device 312 detailed below.

It will be appreciated that CPMU 128 may be implemented as one or more computing platforms which may be in communication with one another. It will also be appreciated that processor 304 may be implemented as one or more processors, whether located on the same platform or not.

CPMU 128 may comprise a controller 308 for controlling the camera, for example setting operation parameters of the camera or of the processing, activating light source 124 when the device is operating in the second mode, or other operations. Controller 308 may be implemented in hardware, software, firmware, or any combination thereof.

CPMU 128 may comprise a storage device 312, such as a hard disk drive, a Flash disk, a Random Access Memory (RAM), a memory chip, or the like. In some exemplary embodiments, storage device 312 may retain program code operative to cause processor 304 to perform acts associated with any of the modules listed below or steps of the method of FIG. 4 below. The program code may comprise one or more executable units, such as functions, libraries, stand-alone programs or the like, adapted to execute instructions as detailed below.

Storage device 312 may comprise image receiving module 316, for receiving and optionally storing as image(s) 336 one or more images or parts thereof received from sensor 100, and/or storing the pixel values in a buffer. The images may be received in any required, known or proprietary format. The images may comprise all or part of the sensor pixels. For example, in a first mode an image comprised of only the pixels of the first group may be received, and in a second mode an image comprised of the pixels of the second group which receive only light from light source 124 may be received.

Storage device 312 may comprise first mode analysis and trigger determination module 320, for receiving an image in a first mode, and determining whether a trigger for operating in a second mode is observed.

Storage device 312 may comprise pixel completion module 324, for completing values of pixels not received in a particular mode. For example, when operating in the second mode, high resolution is required, therefore it is required to complete the values of the pixels of the first group. This is better achieved, if each pixel of the first group is surrounded by pixels of the second group.

Storage device 312 may comprise second mode processing module 328, for processing images captured in the second mode and performing the purpose of the device, for example recognizing faces, or the like.

Storage device 312 may comprise data and control flow management module 332, for managing the activation of the various modules at the required circumstances and with the required data, for example providing an image captured in the first mode to trigger determination module 320, providing an image captured in the second mode to second mode processing module 328, or the like. Data and control flow management module 332 may also send commands to controller 320 to set camera parameters, or the like.

Storage device 312 may comprise interface to external engine 340, for taking an action in response to the analysis of the second image, for example granting or denying access to a physical or computerized area.

Figure 4:
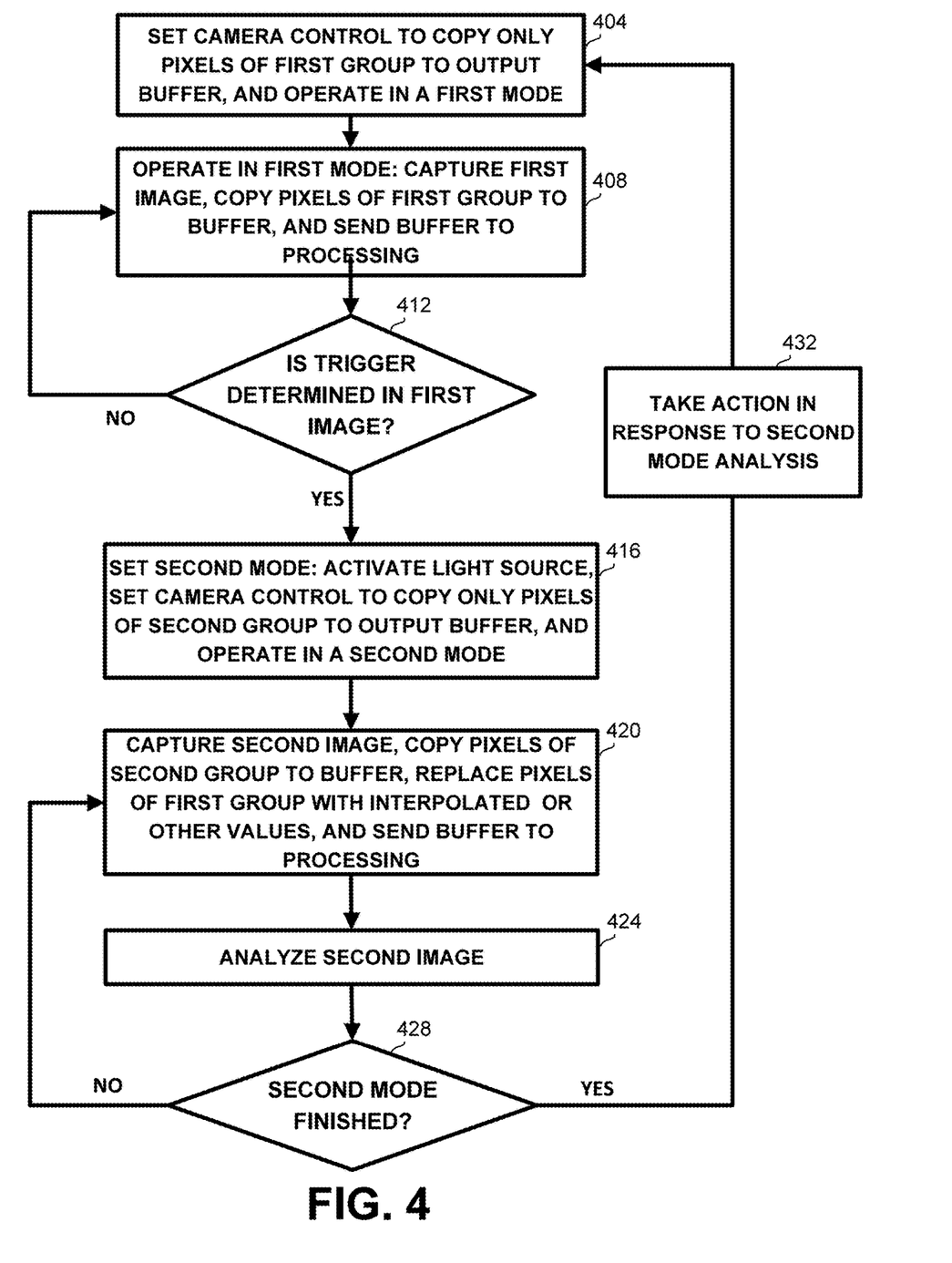
FIG. 4 is a generalized flowchart of a method for operating a dual mode always-on capture and processing device, in accordance with some embodiments of the disclosure.

Referring now to FIG. 4, showing a flowchart of a method for operating a dual mode always-on capture and processing device in dual nod On step 404, the camera may be set, for example by data and control flow management module 332 controlling controller 308 to operate in a first mode in which only a first group of pixels are copied from the sensor to an output buffer. The first group may be the pixels of the first group which receive ambient light, such as the pixels corresponding to areas 112 of mask 108.

On step 408, a first image may be captured in a first mode, and the values of the pixels of the first group may be copied to a buffer, which may be manipulated or analyzed. The buffer may be populated by image receiving module 316, and processed by first mode analysis and trigger determination module 320.

On step 412, the first image may be analyzed using the first analysis mode, for example by first mode analysis trigger determination module 320. Analysis may include determining the occurrence of a trigger, in accordance with the purpose of the device. For example, the trigger may be an object being captured by the device, which may be determined by a small number of pixels, such as the pixels of the first group. In some embodiments, the trigger may be that a head, a face, or a torso of a person is detected in front of the capture device, which may be determined by a small number of pixels, indicating features of a head or a torso. In further embodiments, the trigger may be a change exceeding a predetermined threshold relative to a previous image, indicating that motion has occurred. As a specific example, the analysis may comprise using a machine learning (ML) algorithm that has been trained to identify faces, full bodies, torsos, feet, or any other identifiable feature, according to currently known ML architectures and technologies, or architectures and technologies that will become known in the future.

If no trigger has been detected, execution may return to step 408, and a new image may be captured.

Due to the small number of pixels of the first group, which are used in the first mode, capturing and copying the pixels to the buffer, as well as analyzing the image, does not require significant processing. Thus, steps 408 and 412 which repeat most of the time provide for low power operation.

If the occurrence of a trigger has been detected, then on step 416 the camera may be set, for example by data and control flow management module 316 controlling controller 308 to operate in a second mode in which the IR illuminator is turned on, and only pixels of the second group are copied from the sensor to an output buffer. The pixels of the second group may receive only light in the wavelength of light source 124, such as IR, for example the pixels corresponding to areas 116 of mask 108. It will be appreciated that although the pixels of the first group may also receive IR light (unless specifically masked against IR) since they receive ambient light as well, they may exhibit different behavior, and may thus not be copied in the second mode.

On step 420, a second image may be captured in a second mode, and the pixels of the second group may be copied to a buffer where it may be manipulated or analyzed. The buffer may be received by image receiving module 316. The pixels of the first group, which are a minority of the pixels may be ignored. Alternatively, the values of the pixels of the first group may be set, for example by interpolating values of neighboring pixels. The buffer may then be provided to second mode processing module 328 for processing.

On step 424, the second image comprising the pixels of the second group may be analyzed, for example by second mode processing module 328. Analysis may include performing the purpose of the device, for example comparing the image to a stored image to verify that the captured person should be authorized, building a 3D structure of the object in front of the camera and comparing it to a stored structure, measuring iris parameters and comparing to stored parameters, or the like. It will be appreciated that comparison may include extracting features from the image and comparing the features to pre-stored features, such that if the distance between the extracted features and the pre-stored features is below a threshold, the images are considered similar and the captured person may be authenticated.

On step 428 it may be determined whether the second mode is finished. The second mode may be finished if, for example, it is positively determined whether the captured person is authenticated or not. The second mode may also be finished if a maximal predetermined number of second images have been captured and analyzed without reaching a conclusion. If the second mode is not finished, execution may return to step 420 for capturing and analyzing further images under the second mode. If the second mode is finished, execution may continue on step 432, by taking an action in response to the determination of the analysis of the second mode. For example, if an approved user is recognized, access to a physical domain or to a computerized application or option may be granted. If the user is not approved, a preventive action may be taken, for example denying access to the physical domain or the calling or computerized application or option, sending a message to a person in charge, recording the access attempt, or the like. Execution may then return to step 400 where the first mode is resumed.

It will be appreciated that although the discussion above focuses on the example of face recognition, a device and method in accordance with the disclosure are not limited to 3D recognition applications, and devices and method for carrying out multiple other applications may be provided, such as but not limited to 2D facial recognition based on IR light source, iris detection based on IR light source, or the like. Further applications may include medical usages such as examining the IR reflectance from skin for dermatology purposes, gesture identification for gaming, or the like.

The invention may be a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including wired or wireless local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An object recognition device, comprising:
    an image sensor comprising a plurality of pixels;
    a mask, wherein
        the plurality of pixels comprise pixels of a first group that are not masked by the mask and receive ambient wavelength range, and pixels of a second group that are masked by the mask and receive at least IR wavelength range, wherein the mask passes at most 10% of energy received in the ambient wavelength range, and wherein
    the pixels of the second group are a majority of the pixels;
    an Infra-Red light source; and
    a processor for:
        operating in a first mode in which the light source is inactive, including:
            capturing a first image by the pixels of the first group; and
            analyzing the first image, to recognize whether a trigger event has occurred; and
        subject to occurrence of the trigger event, operating in a second mode, including:
            activating the light source;
            capturing a second image by the pixels of the second group; and
            analyzing the second image.

2. The object recognition device of claim 1, further comprising a second mask for masking the pixels of the first group.

3. The object recognition device of claim 1, wherein the pixels of the second group are at least 75% of the plurality of pixels.

4. The object recognition device of claim 1, wherein the pixels of the first group are arranged in a repeating pattern over the image sensor.

5. The object recognition device of claim 1, wherein the processor is further adapted to resume operation in the first mode after analysis of the second image.

6. The object recognition device of claim 1, wherein the image sensor is configured to capture a body part of a subject.

7. The object recognition device of claim 6, wherein the body part is a face.

8. The object recognition device of claim 1, wherein in the second mode, a value of a pixel of the first group is set in accordance with values of neighboring pixels belonging to the pixels of the second group.

9. The object recognition device of claim 1, wherein the object recognition device operates constantly in the first mode excluding when the second mode is assumed.

10. The object recognition device of claim 1, further comprising interface to an external engine for taking an action in response to the analysis of the second image.

11. A method for activating an object recognition device, comprising:
    operating in a first mode, including:
        capturing a first image by pixels of a first group of pixels of a sensor comprising a multiplicity of pixels; and
        analyzing the first image, to recognize whether a trigger event has occurred; and
    subject to occurrence of the trigger event, operating in a second mode, including:
        activating an Infra-Red light source to illuminate the sensor;
        capturing a second image by pixels of a second group of pixels of the sensor; and
        analyzing the second image, wherein
            a mask is masking the pixels of the second group and not masking the pixels of the first group,
            the pixels of the first group receive ambient wavelength range,
            the pixels of the second group receive IR wavelength range,
            the mask passes at most 10% of energy received in the ambient wavelength range,
            the pixels of the second group outnumber the pixels of the first group.

12. The method of claim 11, wherein the pixels of the first group are masked by a second mask passing the ambient wavelength range.

13. The method of claim 11, wherein the pixels of the first group are arranged in a repeating pattern over an image sensor comprising the pixels of the first group of and the pixels of the second group.

14. The method of claim 11, wherein the processor is further adapted to resume operation in the first mode after analysis of the second image.

15. The method of claim 11, further comprising setting a value of a pixel of the first group in accordance with values of neighboring pixels belonging to the second group.

16. The method of claim 11, wherein the processor operates constantly in the first mode excluding when the second mode is assumed.

17. The method of claim 11, further comprising taking an action in response to a result of analyzing the second image.

18. The method of claim 17 wherein the action comprises granting or denying access of a person to a physical or computerized domain.

19. A computer program product comprising a non-transitory computer readable storage medium retaining program instructions, which program instructions when read by a processor, cause the processor to perform a method comprising:

operating in a first mode, including:
　capturing a first image by pixels of a first group of pixels of a sensor comprising a multiplicity of pixels; and
　analyzing the first image, to recognize whether a trigger event has occurred; and
subject to occurrence of the trigger event, operating in a second mode, including:
　activating an Infra-Red light source to illuminate the sensor;
　capturing a second image by pixels of a second group of pixels of the sensor; and
　analyzing the second image, wherein
a mask is masking the pixels of the second group and not masking the pixels of the first group,
the pixels of the first group receive ambient wavelength range,
the pixels of the second group receive IR wavelength range,
the mask passes at most 10% of energy received in the ambient wavelength range, and
the pixels of the second group outnumber the pixels of the first group.

* * * * *